United States Patent
Wu

(10) Patent No.: US 7,915,945 B2
(45) Date of Patent: Mar. 29, 2011

(54) INRUSH CURRENT LIMITING CIRCUIT AND ELECTRONIC DEVICE USING THE SAME

(75) Inventor: Chun-Te Wu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 126 days.

(21) Appl. No.: 12/483,231

(22) Filed: Jun. 11, 2009

(65) Prior Publication Data
US 2010/0253413 A1  Oct. 7, 2010

(30) Foreign Application Priority Data

Apr. 3, 2009  (CN) .......................... 2009 10 301338

(51) Int. Cl.
*H03K 17/16* (2006.01)
(52) U.S. Cl. ....................................... 327/392; 327/401
(58) Field of Classification Search .......... 327/392–396, 327/398–401
See application file for complete search history.

(56) References Cited

U.S. PATENT DOCUMENTS

| 5,424,669 A * | 6/1995 | Teggatz et al. ................. 327/270 |
| 7,782,122 B2 * | 8/2010 | Tsai et al. ..................... 327/538 |

* cited by examiner

*Primary Examiner* — Hai L Nguyen
(74) *Attorney, Agent, or Firm* — Raymond J. Chew

(57) ABSTRACT

An inrush limiting circuit is connected between an external power source and a plurality of capacitors, and includes a delay trigger signal generator, a plurality of reversing circuits and a plurality of transmission gates. The delay trigger signal generator is connected to the external power source, to receive external power signals and generate a plurality of delay trigger signals. The reversing circuits are connected to the delay trigger signal generator, to reverse the delay trigger signals and output a plurality of the reversed delay trigger signals. The transmission gates are correspondingly connected to the delay trigger signal generator, the reversing circuits and the capacitors, to turn on respectively at different times based on the delay trigger signals and the reversed delay trigger signals, to cause the external power source to charge the capacitors at the different times so as to avoid an inrush current.

10 Claims, 3 Drawing Sheets

INRUSH CURRENT LIMITING CIRCUIT AND ELECTRONIC DEVICE USING THE SAME

BACKGROUND

1. Technical Field

The present disclosure relates to an inrush current limiting circuit and an electronic device using the same.

2. Description of Related Art

Nowadays, in most electronic devices, in order to avoid surge voltage provided to a load, there are a plurality of large capacitors connected in parallel to an external power source. However, when the electronic devices are powered on initially, the large capacitors are shorted instantaneously. Thus, an inrush current is generated, which can damage elements of the electronic devices.

DETAILED DESCRIPTION

Figure 1:
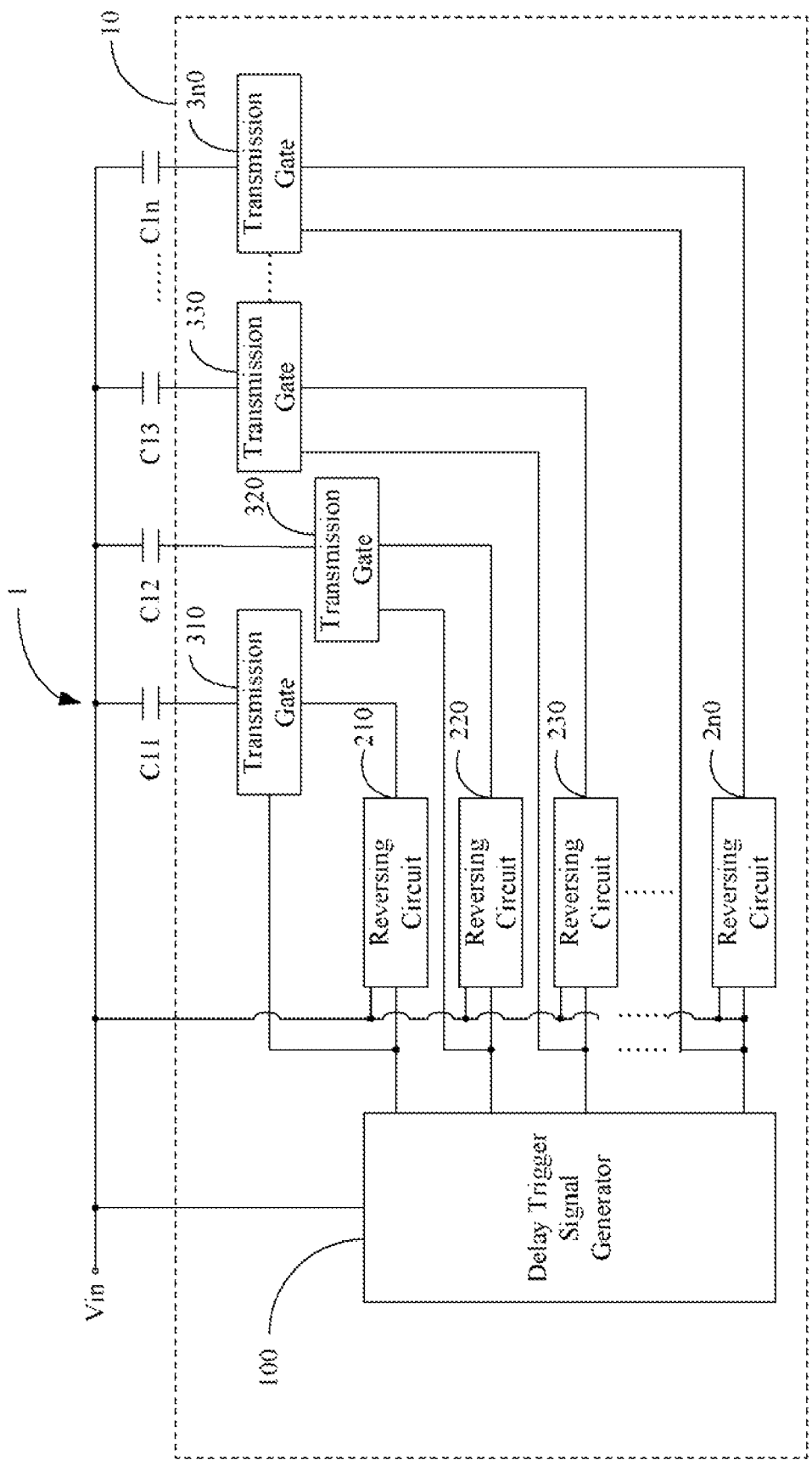
FIG. 1 is a block diagram of one embodiment of an electronic device of the present disclosure.

FIG. 1 is a block diagram of an electronic device 1. The electronic device 1 is connected to an external power source Vin, and comprises a plurality of capacitors C1N and an inrush current limiting circuit 10. It may be understood that N is a positive integer and ranges from 1 to N. In one embodiment, one end of each of the capacitors C1N is connected to the external power source Vin. The inrush current limiting circuit 10 is connected between the other ends of the capacitors C1N and the external power source Vin, to cause the external power source Vin to charge the capacitors C1N at different times to avoid an inrush current. In one embodiment, the inrush current limiting circuit 10 comprises a delay trigger signal generator 100, a plurality of reversing circuits 2N0 and a plurality of transmission gates 3N0. Here, the 2N0 represents 210, 220, 230 . . . and the 3N0 represents 310, 320, 330 . . . . It may be understood that N is a positive integer and ranges from 1 to N.

In the inrush current limiting circuit 10, the delay trigger signal generator 100 is connected to the external power source Vin, to receive external power signals and generate a plurality of delay trigger signals. The reversing circuits 2N0 are connected to the delay trigger signal generator 100 and the external power source Vin, to reverse the delay trigger signals and output a plurality of reversed delay trigger signals. The transmission gates 3N0 are connected between the reversing circuits 2N0 and the other ends of the capacitors C1N respectively, and also connected to the delay trigger signal generator 100, to turn on respectively at different times according to the delay trigger signals and the reversed delay trigger signals. Thus, the external power source Vin can charge the capacitors C1N at the different times.

Figure 2:
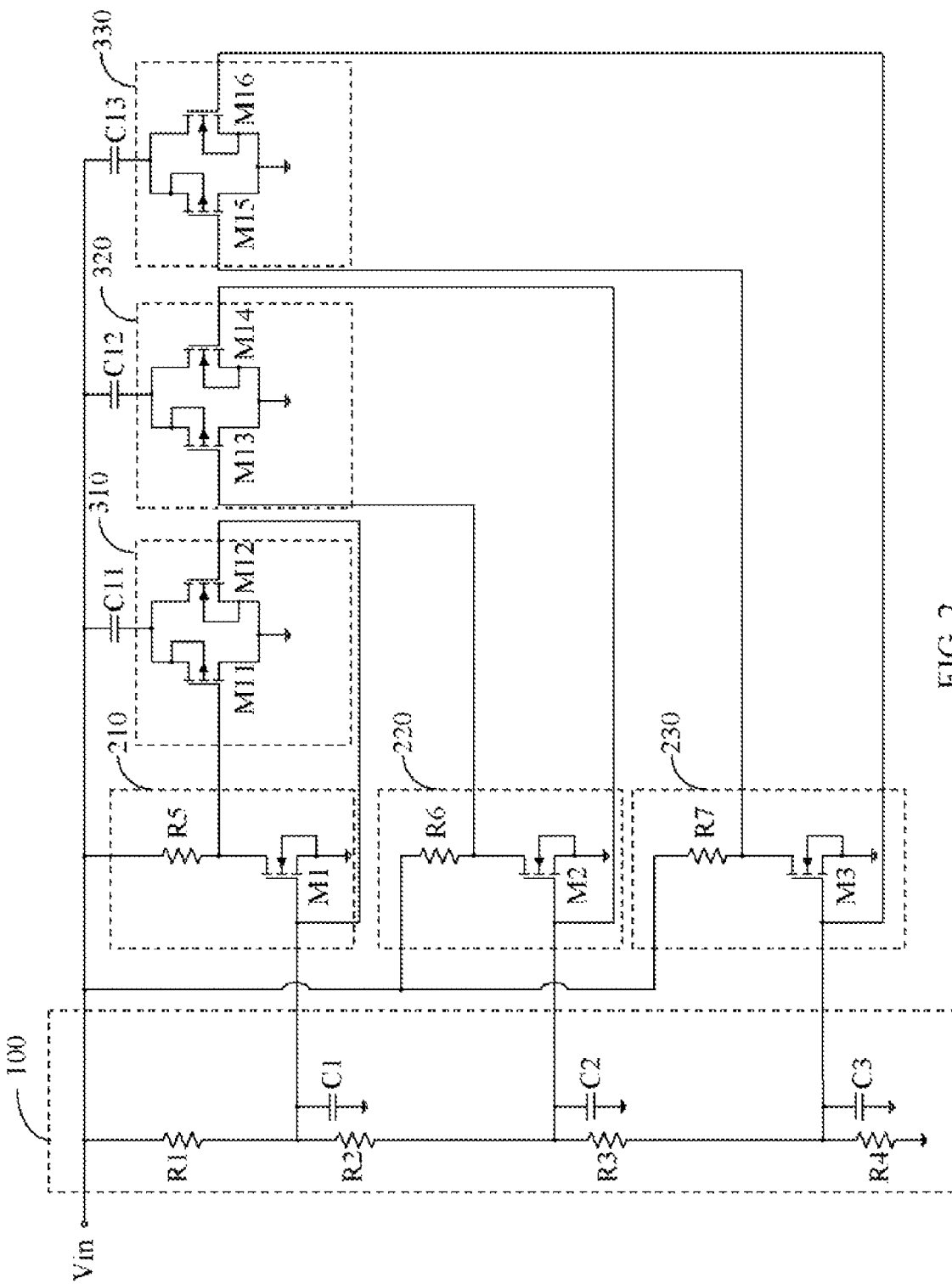
FIG. 2 is a detailed circuit diagram of one embodiment of the inrush current limiting circuit of FIG. 1.

FIG. 2 is a detail circuit of the inrush current limiting circuit 10 of FIG. 1. In order to describe simply and clearly, only three reversing circuits (210, 220, 230), three transmission gates (310, 320, 330), and three capacitors (C11, C12, C13) are illustrated in FIG. 2, but the disclosure is not limited thereto.

The delay trigger signal generator 100 comprises four first resistors R1, R2, R3, R4 and three delay capacitors C1, C2, C3. The first resistors R1, R2, R3, R4 are connected between the external power source Vin and ground in series. In one embodiment, the delay capacitor C1 is connected between a node of the first resistors R1, R2 and ground, which forms a first delay circuit with the first resistor R1, to generate a first delay trigger signal. The delay capacitor C2 is connected between a node of the first resistors R2, R3 and ground, which forms a second delay circuit with the first resistors R1, R2, to generate a second delay trigger signal. The delay capacitor C3 is connected between a node of the first resistors R3, R4 and ground, which forms a third delay circuit with the first resistors R1, R2, R3, to generate the third delay trigger signal. So on through to the $N^{th}$ delay capacitor CN is connected between a node of the first resistors RN, R(N+1) and ground, which forms a $N^{th}$ delay circuit with the first resistors connected in series started from the external power source Vin, to generate the $N^{th}$ delay trigger signal.

Each of the reversing circuits 210, 220 and 230 comprises a second resistor and a first switch component. Because arrangements of the reversing circuits 210, 220 and 230 are the same, only the reversing circuit 210 is described below. In the reversing circuit 210, the first switch component M1 comprises a first electrode, a second electrode and a third electrode. The first electrode of the first switch component M1 receives the first delay trigger signal. The second electrode of the first switch component M1 outputs the first reversed delay trigger signal, and a third electrode thereof is grounded. In one embodiment, the first switch component is a common source transistor, especially is an n-type metallic oxide semiconductor field effect transistor (MOSFET). In addition, the first electrode of the first switch component is a gate, the second electrode thereof is a drain and the third electrode is a source. The second resistor R5 is connected between the second electrode of the first switch component M1 and the external power source Vin, to limit current flowing therethrough.

Similarly, connections between the reversing circuits 220, 230 and the delay trigger signal generator 100 are the same as those of the reversing circuit 210 and the delay trigger signal generator 100, and so are omitted from this description.

Each of the transmission gates 310, 320, 330 comprises a second switch component and a third switch component. Each of the second and the third switch components comprises a first electrode, a second electrode and a third electrode. Similarly, because arrangements of the transmission gates 310, 320, 330 are the same, only the transmission gate 310 is described below. In the transmission gate 310, the first electrode of the second switch component M11 is connected to the second electrode of the first switch component M1, to receive the first reversed delay trigger signal. The second electrode of the second switch component M11 is grounded. The first electrode of the third switch component M12 is connected to the first electrode of the first switch component M1, to receive the first delay trigger signal. The third electrode of the second switch component M11 is grounded. The third electrode of the second switch component M11 and the second electrode of the third switch component M12 are commonly connected to the external power source Vin via the capacitor C11. In one embodiment, the second and the third switch components are the common source transistors, especially the second switch component is a p-type MOSFET and the third switch component M12 is an n-type MOSFET. In addition, the first electrodes of the second and the third switch components M11, M12 are gates, the second electrodes thereof are drains and the third electrodes thereof are sources.

Similarly, connections between the transmission gates 320, 330 and the reversing circuits 220, 230 are the same as those of the transmission gate 310 and the reversing circuit 210, and are omitted from the description.

Figure 3:
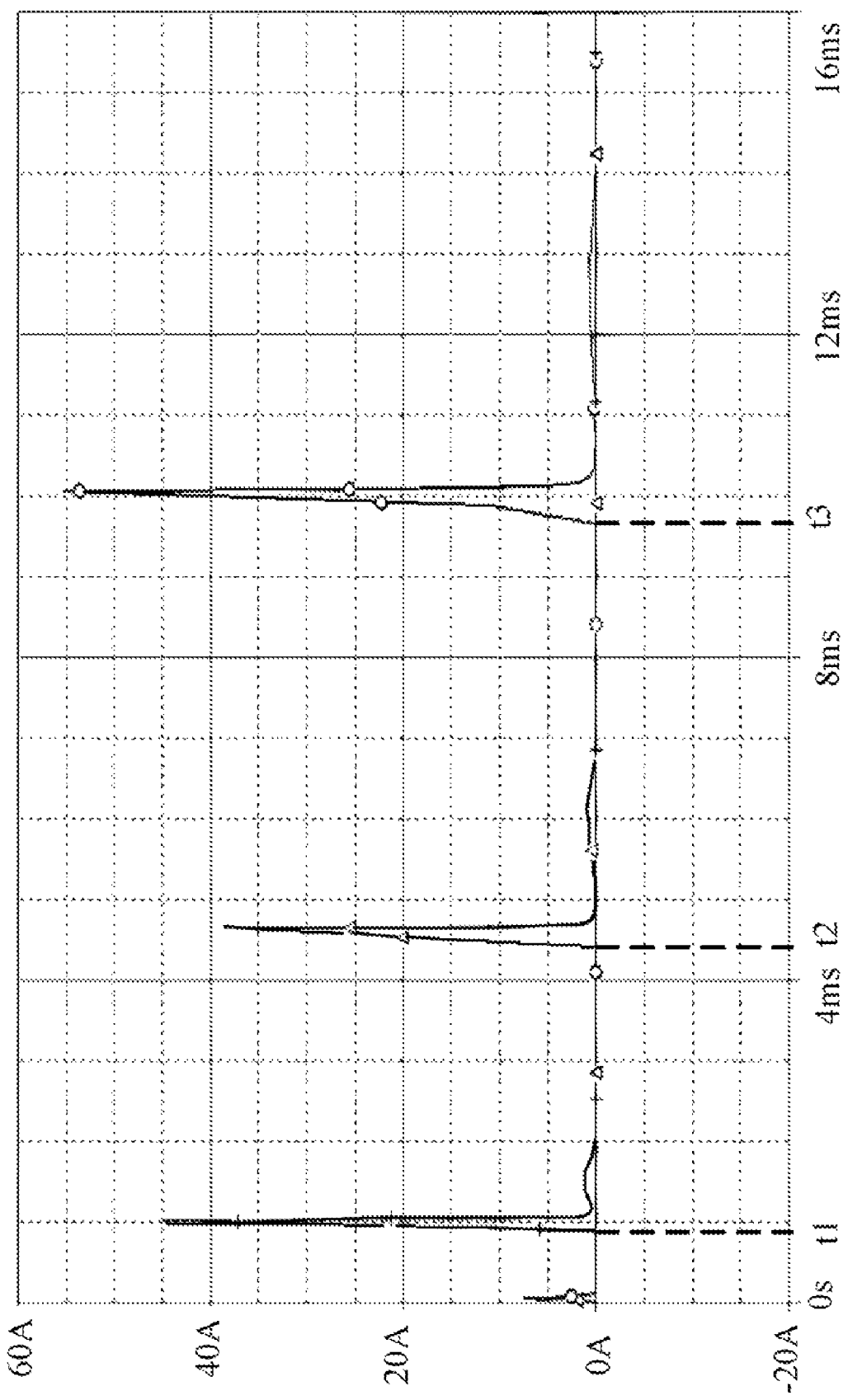
FIG. 3 is an exemplary signal waveform diagram of FIG. 2.

Also referring to FIG. 3, an exemplary sine waveform diagram of the inrush current limiting circuit 100 is shown. Principle of the inrush current limiting circuit 100 is described below:

When the electronic device 1 is powered on initially, the external power source Vin charges the delay capacitor C1. At time T1, the voltage of the capacitor C1 is higher than a threshold voltage of the first switch component M1, thus, the first switch component M1 is on and the third switch component M12 is also on. Accordingly, a voltage of the drain of the first switch component M1 is dropped to zero, so that the second switch component M11 is on. In one embodiment, at the time T1, the second switch component M11 and the third switch component M12 are on simultaneously, thus, the capacitor C11 can be charged by the external power source Vin.

After the time T1, the external power source Vin can charge the delay capacitor C2 via the first resistors R1, R2. At the time T2, voltage of the delay capacitor C2 is higher than a threshold voltage of the first switch component M2, thus, the first switch component M2 is on and the third switch component M14 is also on. Accordingly, a voltage of the drain of the first switch component M2 is dropped to zero, so that the second switch component M13 is on. In one embodiment, at the time T2, the second switch component M13 and the third switch component M14 are on simultaneously, thus, the capacitor C12 can be charged by the external power source Vin.

After the time T2, the external power source Vin can charge the delay capacitor C3 via the first resistors R1, R2, R3. At the time T3, voltage of the delay capacitor C3 is higher than a threshold voltage of the first switch component M3, thus, the first switch component M3 is on and the third switch component M16 is also on. Accordingly, a voltage of the drain of the first switch component M3 is dropped to zero, so that the second switch component M14 is on. In one embodiment, at the time T3, the second switch component M15 and the third switch component M16 are on simultaneously, thus, the capacitor C13 can be charged by the external power source Vin.

Above all, the capacitors C11, C12, C13 are charged by the external power source Vin at different times T1, T2, T3 when the electronic device 1 is powered on, thus avoiding inrush current generated due to simultaneously charging the capacitors C11, C12, C13.

In one embodiment, capacitance of the delay capacitors C1, C2, C3 are the same, so that charging times of the delay capacitors C1, C2, C3 are determined by resistance of the first resistors R1, R2, R3, R4. In detail, the charging time of the delay capacitor C1 depends on the resistance of the first resistor R1. The charging time of the delay capacitor C2 depends on the resistance of the first resistors R1, R2. The charging time of the delay capacitor C3 depends on the resistance of the first resistors R1, R2, R3.

In alternative embodiments, the inrush current limiting circuit 10 comprises N reversing circuits and N transmission gates. The delay trigger generator 100 generates N delay trigger signals. The reversing circuits converts the N delay trigger signals to N reversed delay trigger signals. Therefore, the N transmission gates are on at different times according to the N delay trigger signals and N reversed delay trigger signals, which causes the external power source Vin to charge the N capacitors at N different times when the electronic device 1 is powered on. Thus, inrush current can be affectively avoided.

Above all, in the present disclosure, the inrush current limiting circuit 10 can charge the capacitors connected in parallel to the external power source Vin at different times, which prevents inrush current effectively.

Although the features and elements of the present disclosure are described in various inventive embodiment in particular combinations, each feature or element can be configured alone or in various within the principles of the present disclosure to the full extent indicated by the broad general meaning of the terms in which the appended claims are expressed.

What is claimed is:

1. An inrush current limiting circuit, connected between an external power source and a plurality of capacitors, wherein one end of each of the capacitors is connected to the external power source, the inrush limiting circuit comprising:
   a delay trigger signal generator, to receive external power signals from the external power source and to generate a plurality of delay trigger signals;
   a plurality of reversing circuits, to reverse the delay trigger signals and to output a plurality of reversed delay trigger signals; and
   a plurality of transmission gates each of which connected among the delay trigger signal generator, one of the reversing circuits and the other end of one of the capacitors, to turn on respectively at different times based on the delay trigger signals and the reversed delay trigger signals, to cause the external power source to charge the capacitors at the different times so as to avoid an inrush current.

2. The inrush current limiting circuit as claimed in claim 1, wherein the delay trigger signal generator comprises:
   (N+1) first resistors, connected between the external power source and ground in series, wherein N is a positive integer and ranges from 1 to N;
   N delay capacitors, wherein a $M^{th}$ delay capacitor and M first resistors connected in series started from the external power source collectively form the $M^{th}$ delay circuit, to generate the $M^{th}$ delay trigger signal, M=1, 2, 3, ..., N;
   wherein the $M^{th}$ delay capacitor is connected between a node of the $M^{th}$, $(M+1)^{th}$ first resistors and ground.

3. The inrush current limiting circuit as claimed in claim 1, wherein each reversing circuit comprises:
   a second resistor;
   a first switch component comprising a first electrode received one of the delay trigger signals, a second electrode connected to the external power source via the second resistor and output one of the reversed delay trigger signals, and a third electrode connected to ground.

4. The inrush current limiting circuit as claimed in claim 3, wherein each transmission gate comprises:
   a second switch component comprising a first electrode connected to the second electrode of the first switch component to receive said one of the reversed delay trigger signals, a second electrode connected to ground, and a third electrode connected to the other end of a corresponding capacitor; and
   a third switch component comprising a first electrode connected to the first electrode of the first switch component to receive said one of the delay trigger signals, a second electrode connected to a third electrode of the second switch component, and a third electrode connected to ground;
   wherein the second and third switch components are simultaneously switched on based on one of the delay trigger signals and one of the reversed delay trigger signals, to cause the external power source to charge the corresponding capacitor.

5. The inrush current limiting circuit as claimed in claim 4, wherein the first and third switch components are n-type common source transistors, and the second switch component is a p-type common source transistor.

6. An electronic device connected to an external power source, comprising:
   a plurality of capacitors, one end of which connected to the external power source;
   an inrush current limiting circuit, connected between the external power source and the capacitors, comprising:
   a delay trigger signal generator, to receive external power signals from the external power source and to generate a plurality of delay trigger signals;
   a plurality of reversing circuits, to reverse the delay trigger signals and to output a plurality of reversed delay trigger signals; and
   a plurality of transmission gates each of which connected among the delay trigger signal generator, one of the reversing circuits and the other end of one of the capacitors, to turn on respectively at different times based on the delay trigger signals and the reversed delay trigger signals, and then to cause the external power source to charge the capacitors at the different times so as to avoid an inrush current.

7. The electronic device as claimed in claim 6, wherein the delay trigger signal generator comprises:
   (N+1) first resistors, connected between the external power source and ground in series, wherein N is a positive integer and ranges from 1 to N;
   N delay capacitors, wherein a $M^{th}$ delay capacitor and M first resistors connected in series started from the external power source collectively form the $M^{th}$ delay circuit, to generate the $M^{th}$ delay trigger signal, M=1, 2, 3, ..., N;
   wherein the $M^{th}$ delay capacitor is connected between a node of the $M^{th}$, $(M+1)^{th}$ first resistors and ground.

8. The electronic device as claimed in claim 6, wherein each reversing circuit comprises:
   a second resistor;
   a first switch component comprising a first electrode received one of the delay trigger signals, a second electrode connected to the external power source via the second resistor and output one of the reversed delay trigger signals, and a third electrode connected to ground.

9. The electronic device as claimed in claim 8, wherein each transmission gate comprises:
   a second switch component comprising a first electrode connected to the second electrode of the first switch component to receive said one of the reversed delay trigger signals, a second electrode connected to ground, and a third electrode connected to the other end of a corresponding capacitor; and
   a third switch component comprising a first electrode connected to the first electrode of the first switch component to receive said one of the delay trigger signals, a second electrode connected to a third electrode of the second switch component, and a third electrode connected to ground;
   wherein the second and third switch components are simultaneously switched on based on one of the delay trigger signals and one of the reversed delay trigger signals, to cause the external power source to charge the corresponding capacitor.

10. The electronic device as claimed in claim 9, wherein the first and third switch components are n-type common source transistors, and the second switch component is a p-type common source transistor.

* * * * *